US012385292B2

(12) United States Patent
Hortobagy

(10) Patent No.: US 12,385,292 B2
(45) Date of Patent: Aug. 12, 2025

(54) LOCKING DEVICE FOR A CONTAINER OR LID, IN PARTICULAR OF MOTOR VEHICLES, WHICH CAN BE ACTUATED BETWEEN A CLOSED AND OPEN POSITION

(71) Applicant: Weber GmbH & Co., KG, Dillenburg (DE)

(72) Inventor: Frank Hortobagy, Steffenberg (DE)

(73) Assignee: Weber GmbH & Co. KG, Dillenburg (DE)

(*) Notice: Subject to any disclaimer, the term of this patent is extended or adjusted under 35 U.S.C. 154(b) by 158 days.

(21) Appl. No.: 18/007,385

(22) PCT Filed: Aug. 19, 2020

(86) PCT No.: PCT/EP2020/073171
§ 371 (c)(1),
(2) Date: Jan. 30, 2023

(87) PCT Pub. No.: WO2022/037769
PCT Pub. Date: Feb. 24, 2022

(65) Prior Publication Data

US 2023/0279701 A1 Sep. 7, 2023

(51) Int. Cl.

| | |
|---|---|
| ***E05B 77/06*** | (2014.01) |
| ***E05B 83/32*** | (2014.01) |
| ***E05C 19/02*** | (2006.01) |

(52) U.S. Cl.
CPC .............. *E05B 77/06* (2013.01); *E05B 83/32* (2013.01); *E05C 19/022* (2013.01)

(58) Field of Classification Search
CPC .......... E05B 77/02; E05B 77/04; E05B 77/03; E05B 77/12; E05B 83/28; E05B 83/30; E05B 83/32; E05B 83/34; E05B 65/46; E05C 19/02; E05C 19/022; E05C 19/028; E05C 19/04
See application file for complete search history.

(56) References Cited

U.S. PATENT DOCUMENTS

| | | | | |
|---|---|---|---|---|
| 5,603,540 A * | 2/1997 | Shibao | E05B 77/06 292/341.15 |
| 6,213,533 B1 | 4/2001 | Widulle et al. | |
| 6,808,214 B2 * | 10/2004 | Sato | E05B 77/06 292/341.15 |

(Continued)

FOREIGN PATENT DOCUMENTS

| | | |
|---|---|---|
| DE | 9412661 U1 | 10/1994 |
| DE | 202010006291 U1 | 9/2011 |

(Continued)

*Primary Examiner* — Kristina R Fulton
*Assistant Examiner* — Noah Horowitz
(74) *Attorney, Agent, or Firm* — Rogowski Law LLC

(57) ABSTRACT

A locking device for a container or lid (2) is actuatable between an opened and closed position in relation to a housing element (1). A guide pin (4) arranged on a swiveling lever (5) engages into a connecting link (3). The connecting link (3) has a slope (9) by which the pin (4) glides in the direction (16) of a dead stop (7) arranged on a container or lid (2) under the influence of external acceleration forces to bring a lever (5) into a position blocking movement of the container or lid (2).

14 Claims, 5 Drawing Sheets

(56) References Cited

U.S. PATENT DOCUMENTS

| | | | | |
|---|---|---|---|---|
| 7,303,216 | B2 * | 12/2007 | Bella | E05B 77/06<br>292/303 |
| 7,793,995 | B2 * | 9/2010 | King | E05B 77/06<br>292/332 |
| 7,959,202 | B2 * | 6/2011 | Ahn | E05B 77/06<br>296/187.05 |
| 8,398,130 | B2 * | 3/2013 | Park | E05B 83/28<br>292/DIG. 22 |
| 9,080,353 | B2 * | 7/2015 | Washio | E05B 83/30 |
| 9,523,222 | B2 * | 12/2016 | Zhang | E05B 83/28 |
| 10,024,087 | B2 * | 7/2018 | Nakashima | E05B 77/06 |
| 10,696,204 | B2 * | 6/2020 | Stewart | B60N 2/753 |
| 11,885,171 | B2 * | 1/2024 | Hodgson | E05F 3/22 |
| 2002/0171251 | A1 | 11/2002 | Bieck et al. | |
| 2010/0001539 | A1 | 1/2010 | Kikuchi et al. | |
| 2020/0087967 | A1 * | 3/2020 | Hodgson | E05B 83/32 |
| 2020/0408005 | A1 * | 12/2020 | Santillan Gutierrez | B60R 7/04 |

FOREIGN PATENT DOCUMENTS

| | | | |
|---|---|---|---|
| DE | 102010050800 | A1 | 5/2012 |
| EP | 0978418 | A1 | 2/2000 |
| EP | 1253271 | A2 | 10/2002 |
| JP | 2008156841 | A | 7/2008 |

* cited by examiner

LOCKING DEVICE FOR A CONTAINER OR LID, IN PARTICULAR OF MOTOR VEHICLES, WHICH CAN BE ACTUATED BETWEEN A CLOSED AND OPEN POSITION

CROSS-REFERENCE TO RELATED APPLICATION

This application is a national stage application (under 35 USC § 371) of PCT/EP2020/073171, filed Aug. 19, 2020, the contents of each of which is incorporated by reference herein.

BACKGROUND OF THE INVENTION

Technical Field and State of the Art

The invention relates to a locking device for a container or lid actuated between a closed and opened position in relation to a housing element, in particular for motor vehicles, having a connecting link and a guide pin engaged with a connecting link, the guide pin being arranged on a swiveling lever.

One example of such a locking mechanism is known for example from EP 1 253 271 A2. The locking mechanism as a connecting link and a pin cooperating with the connecting link, wherein the pin is released from the connecting link beyond a position locked into the connecting link by over-pushing in locking direction. In order to prevent self-actuated opening of the drawer in an accident, in particular a front-end collision, the push-push locking mechanism used to keep the drawer closed is adapted as an intertial locking mechanism. For this purpose, the pin engaging into the connecting link is arranged on a swiveling lever equipped with an add-on weight that exerts a moment on the lever in the event of an accident, said moment preventing the pin from being released from a cardioid of the connecting link.

Another example of a locking device with a push-push mechanism for a container or lid in motor vehicles actuated between a closed and opened position in relation to a housing element is also known from DE 10 2010 050 800 A1. The locking device has a connecting link and a guide pin engaging into the connecting link and connected to the container or lid, wherein the container or lid is held in a detent position against the force of a spring element. The connecting link is adapted as a curved bar that can be shifted in the connecting link vertically in relation to the opening motion of the container or lid as a function of the guide pin position. An inertia-controlled locking bar is in this case provided that is brought into a position locking the motion of the curved bar under the influence of external acceleration forces in swivel direction of the container or lid.

A storage compartment or pullout compartment for motor vehicles that can be moved from a home position into a user position by pulling out in the manner of a drawer and that projects into the passenger compartment in the open position is known from EP 0 978 418 A1. In order to avoid an undesirable uncommanded opening of the compartment in an accident, a swiveling bar is provided that engages into, and locks, with the drawer element located in the home position.

A locking device to lock a swivel body, such as storage compartments in motor vehicle doors, rotatably mounted about a swivel axis is known from DE 44 27 769 C1, wherein the swivel body is pre-tensioned by an actuating spring. A connecting link control mechanism is arranged on the swivel body into which a pin of a swiveling arresting lever engages. The swiveling away of the arresting lever and the resulting undesired opening of the swivel body on a strong impulse, for example in a collision, is prevented by an unlocking block to secure the arresting lever in a locked position as soon as a strong impulse acts on the swivel body and on the locking device at the same time.

The known locking mechanisms identified above cause significant design effort.

By contrast, the current invention is based on the objective to specify a locking device of the class referenced above, by which simple design means are employed to reliably avoid unintended opening of the container or lid when external acceleration forces are exerted.

SUMMARY OF THE INVENTION

An embodiment of the locking device of the invention has a connecting link for example arranged on the container or lid, and a guide pin engaged into the connecting link and arranged on a lever. The lever for example swivels on the housing and can be brought into a position blocking its movement when influenced by external acceleration forces in the actuation direction of the container or lid. For this purpose, the connecting link has a slope or ramp by which the guide pin is either lifted under the influence of the acceleration occurring in an accident, for example in a front-end collision but also in a side impact collision, or is deflected in the direction of the vehicle transverse axis in an alternative design, to be brought into contact position with a dead stop.

The inventive crash block is characterized by an extremely simple design. This involves merely integrating a slope or ramp into the connecting link guide for locking and unlocking the container or lid and already present on sliding or swiveling containers or lids. An additional inertial locking mechanism, eccentrically arranged add-on weights, or additional inertia controlled locking bars, or even movably arranged weights, are not required. The inventive crash block is activated solely by the acceleration force exerted on the container or lid. For example, the trigger path of the container or lid when the latter is moved from the closed to the opened position can be used to lift or deflect the lever by several angular degrees to bring the lever into contact position with a dead stop such that the storage compartment or container remains closed.

At low opening speeds—that is to say in normal vehicle operations—the guide pin is guided in the connecting link to bring the container or lid from the closed to the opened position. Only during a crash, the slope or ramp of the connecting link guide causes the lever to experience a motion component in direction of one of the vehicle axes to be brought into an actuating position with a dead stop to bring the container or lid into a locking position. This ensures that objects stored in a container in the vehicle interior do not get flung about and injure vehicle passengers as a consequence of a crash. The container also remains closed in a crash.

According to the invention, the connecting link with slope or ramp can be arranged on the container or lid, and the lever can swivel on the housing. The inverse arrangement, wherein the connecting link with slope or ramp can be arranged on the housing and the lever can be arranged on the container or lid with its swivel axis, is also conceivable.

The connecting link with slope or ramp can for example extend on a side wall of the container or lid in shifting direction of the latter, wherein the lever experiences a moment in the direction of the vehicle high axis under the influence of external acceleration forces, the moment bringing the lever into contact position with the dead stop.

But it is also conceivable that the connecting link with slope extends on or in the bottom of the container or lid in the shifting direction of the latter, wherein the lever then experiences a moment in the vehicle's transverse axis in a vehicle collision, and the lever is then brought into contact position with the dead stop as a result of its lateral deflection motion.

According to an embodiment of the invention, it can be expedient that the dead stop and lever have detent and opposing detent means cooperating with each other in the locking position to ensure that the storage compartment cannot open under any circumstances in the event of a crash. After a crash, the storage compartment can only be opened by overcoming the detent connection and by shifting the lid.

According to an embodiment of the invention, it is of course also possible that the locking device is used on a so-called push-push mechanism, wherein the container or lid is held against the force of a spring element in a detent position, for example a cardioid. Here too, the trigger path is used as part of the opening motion to deflect the lever by several angular degrees in the event of a crash such that the lever is brought into contact position without the storage compartment or lid opening further.

DESCRIPTION OF THE DRAWINGS

Further objectives, advantages, features, and applications of the present invention are derived from the subsequent description of an embodiment by way of the drawings. All described and/or depicted features per se or in any combination constitute the subject matter of the present invention, regardless of their summary in the patent claims or their back-reference.

There is shown in.

DETAILED DESCRIPTION

Figure 1:
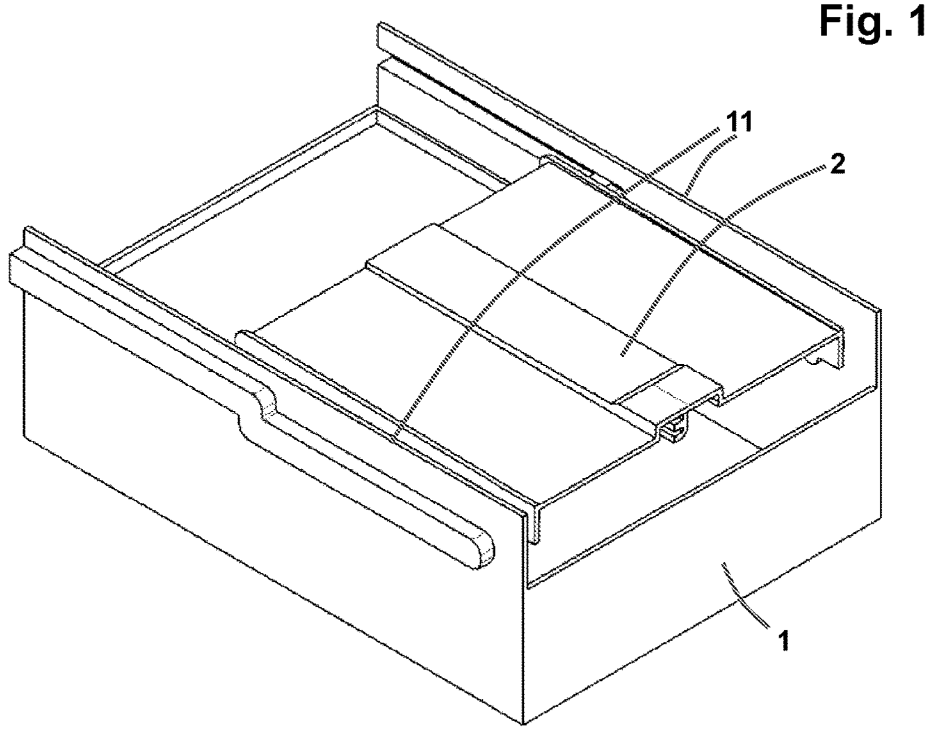
FIG. 1 a possible embodiment of the storage compartment with inventive locking device in a perspective representation and closed state, FIG. 2 the storage compartment according to FIG. 1 in a side view, FIG. 3 the storage compartment according to FIGS. 1 and 2 in an open position, FIG. 4 an enlarged representation of a cross section of the storage compartment in a closed position, FIGS. 5 to 7 the storage compartment according to FIG. 4 in a lengthwise cross-section, at the start of the opening motion of the lid, FIG. 8 the storage compartment in the closed state of the lid, but immediately when a crash occurs, and FIG. 9 the storage compartment during a crash in locked position of the lid.

The storage compartment shown in the figures is for example intended for the center console of a motor vehicle. But storage compartments arranged to swivel in the motor vehicle doors are also conceivable.

The storage compartment has a housing 1 that can be inserted into a receiver of the motor vehicle, wherein the housing is lockable with a lid 2. The lid 2 can be moved from a closing to an opening motion and vice-versa.

In the exemplary embodiment selected here, a connecting link 3 is provided on both sides of the lid 2 along its side walls to guide the lid 2 on the housing 1, wherein a guide pin 4 arranged on a lever 5 engages into the connecting link 3. The lever 5 is arranged on an axis of rotation 10 on the housing side. The connecting link 3 secures the lid 2 in its opened position. The connecting link tracks 12 on each side of the housing 1 have a contour to bring the lid 2 into the opened position of the compartment in a space-conserving manner.

Figure 2:
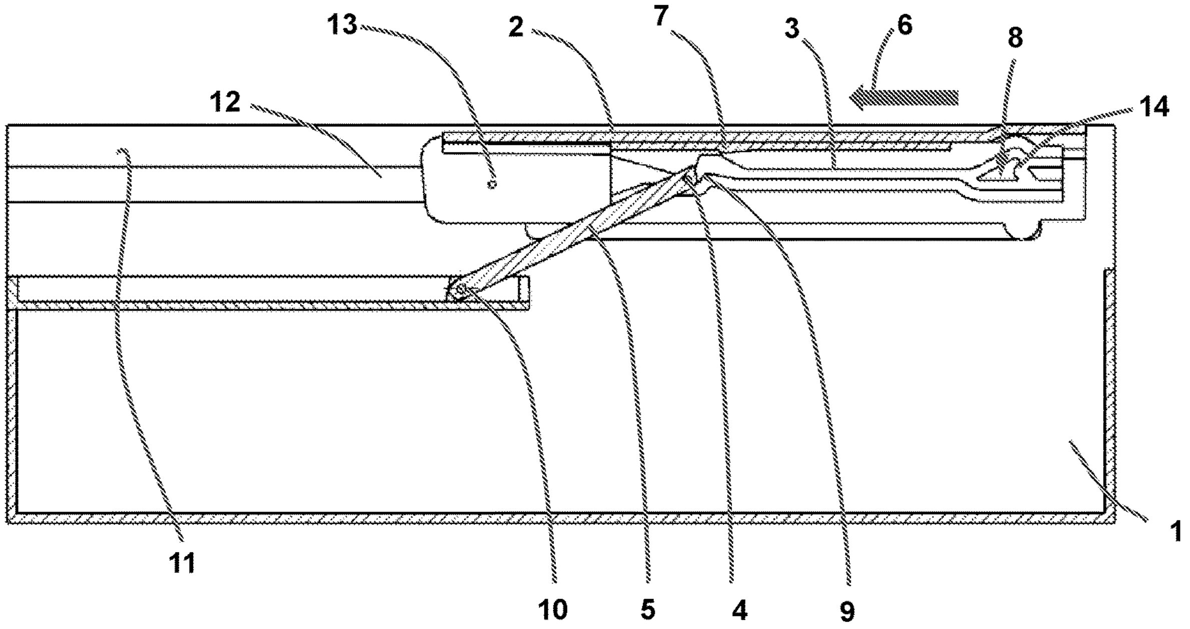
Figure 3:
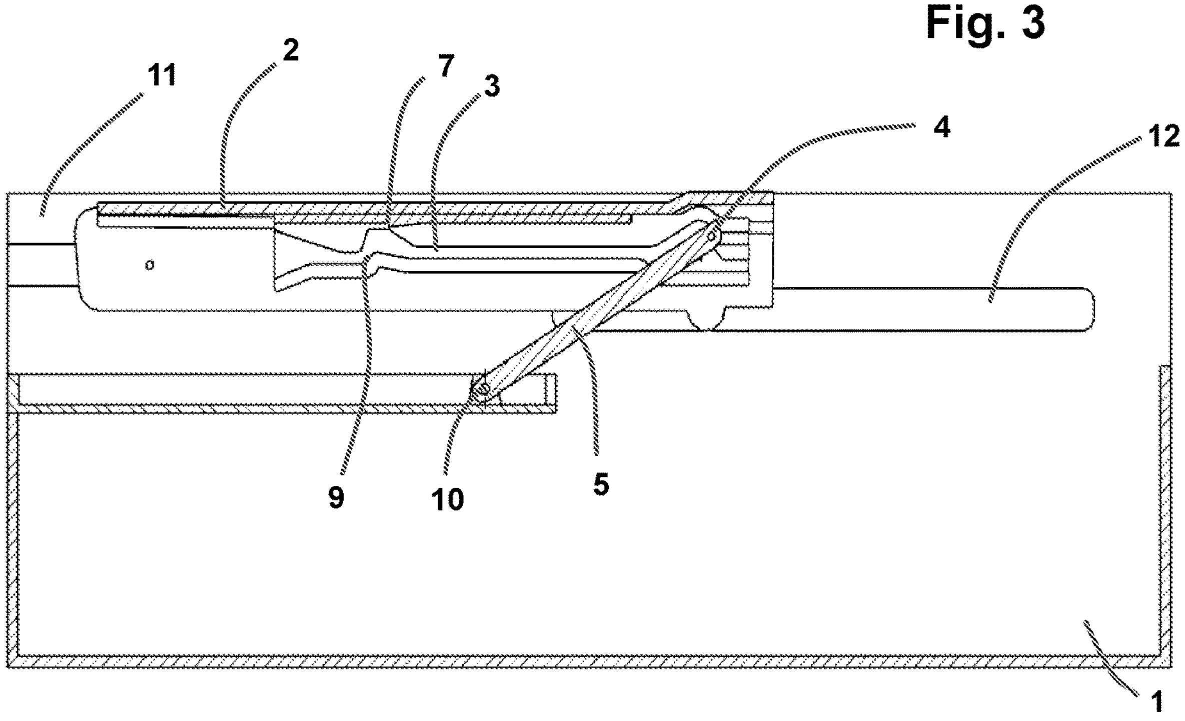

The lid 2 is opened by sliding the latter leftward in direction of the arrow 6 against the force of a (not shown) spring in FIG. 2. During this normal opening motion, the pin 4 glides over the ramp 9 until the lid 2 has reached its opened position according to FIG. 3. The pin 4 in this case engages on the lever 5 into a locking recess 14 on the cardioid 8 and keeps the lid 2 in the opened position.

Figure 4:
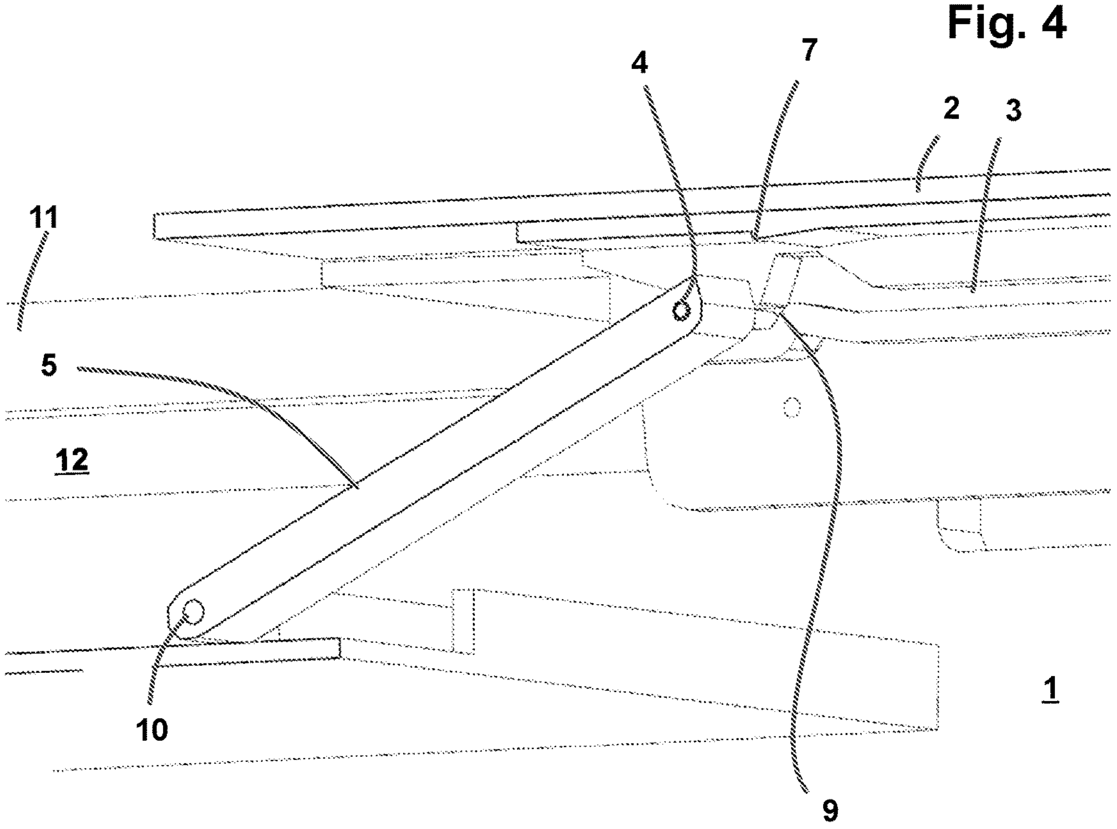
Figure 5:
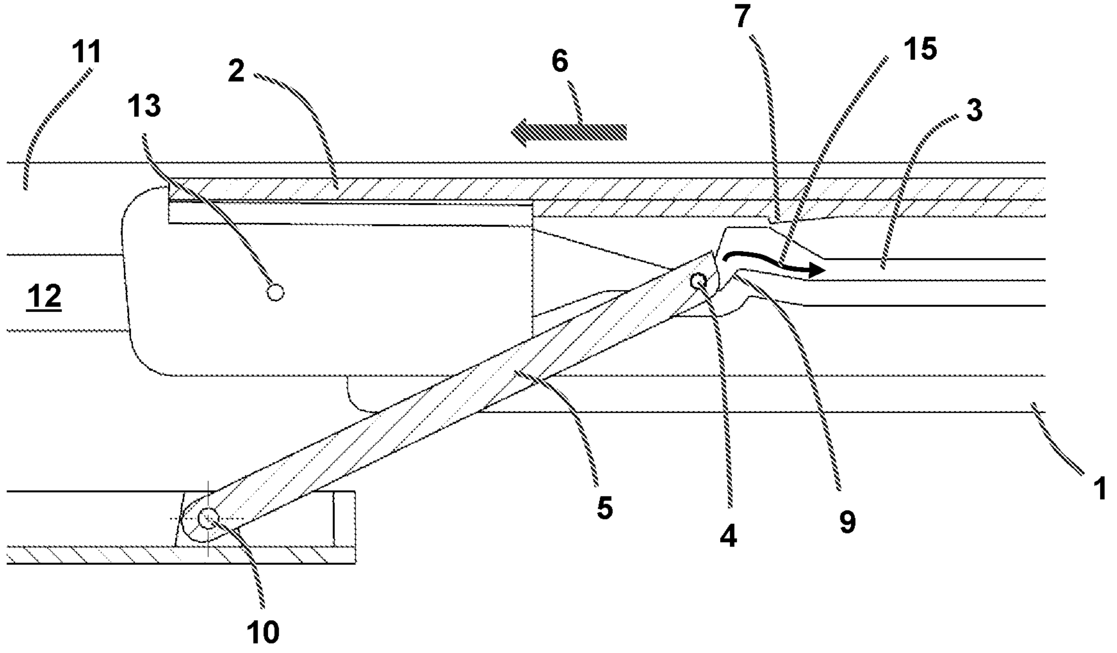
Figure 6:
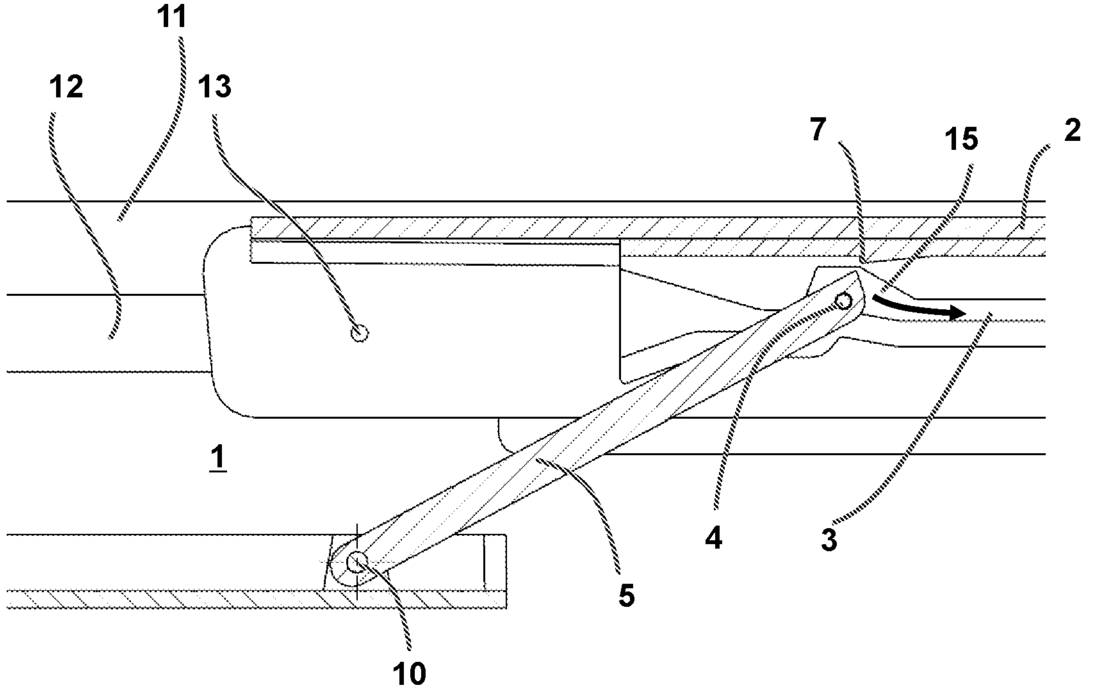
Figure 7:
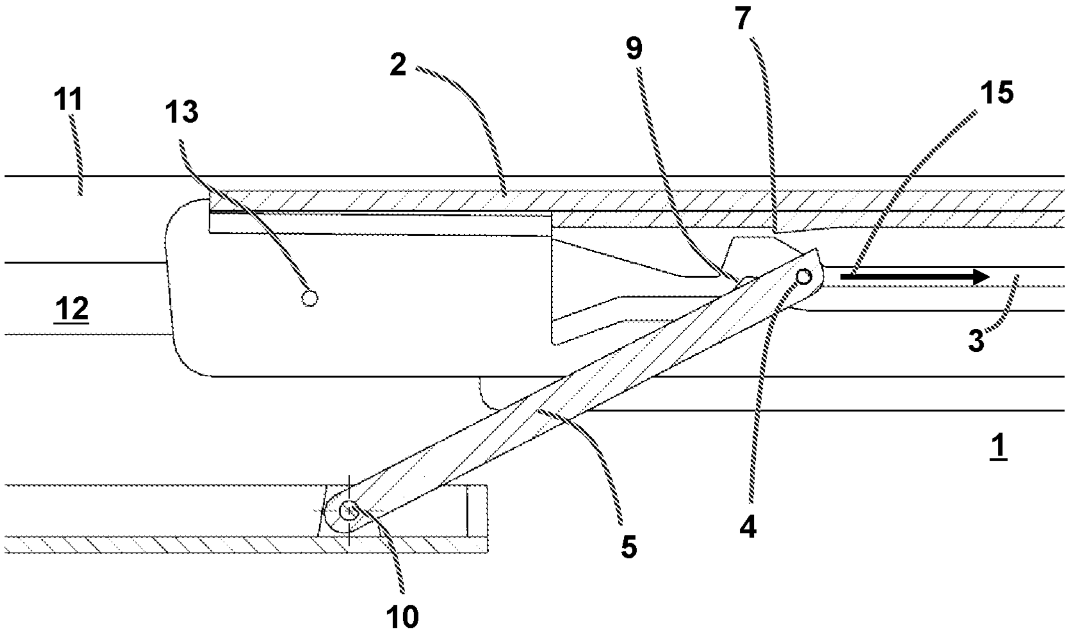
Figure 8:
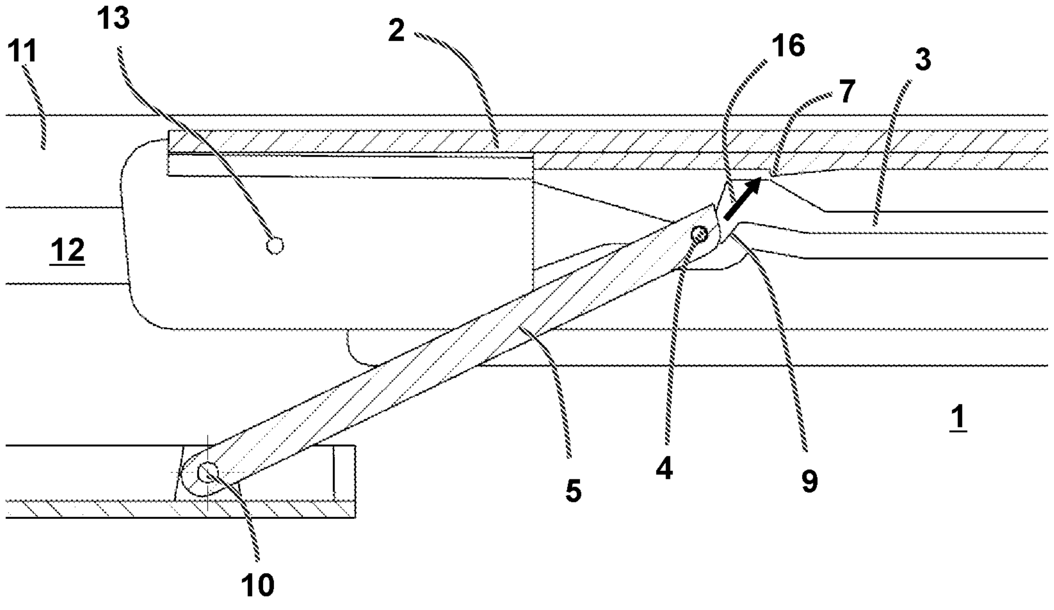
Figure 9:
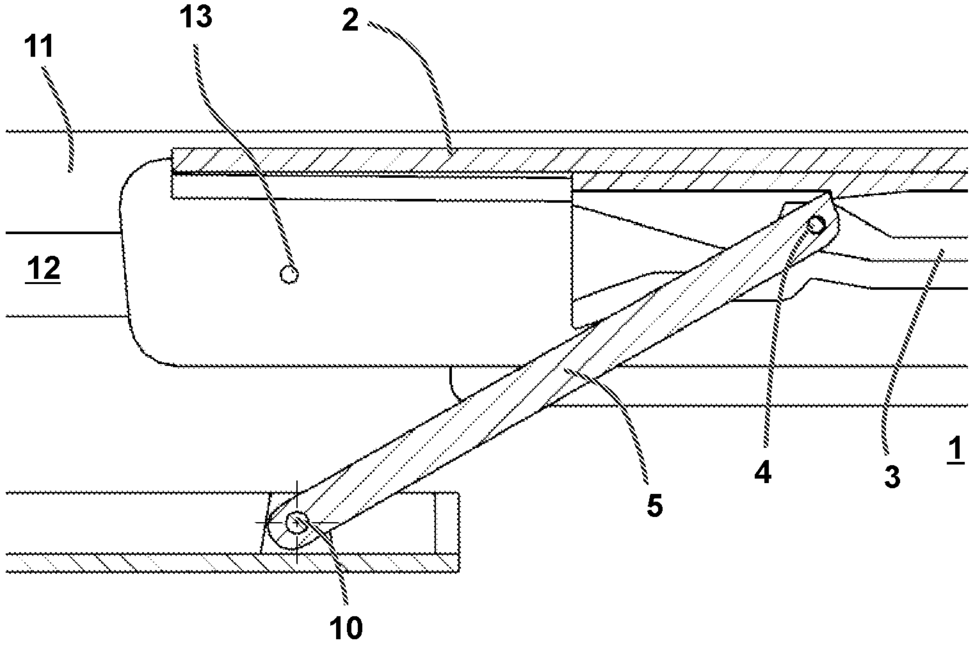

When the lid 2 is now brought back into the closed position, the lid 2 is briefly shifted inward against the force of the (not shown) spring in direction of the opening position, which is also called over-pushing. In this case, the pin 4 disengages from the locking recess 14 of the cardioid 8 such that the opening position is unlocked and the lid 2 is brought back into its closed position according to FIGS. 1 and 2 by spring force. The guide pin 4 in this case glides lengthwise along the connecting link 3 over a ramp 9 or slope into the position as shown in FIGS. 4 and 5.

To open the lid 2, the guide pin 4 glides in the connecting link 3 until the guide pin 4 engages behind the locking recess 14 of the cardioid 8 in the open position, and the guide pin 4 holds the lid 2 in the open position. This normal, or also slow, opening speed of the lid 2 is shown in FIGS. 4 to 7. When the vehicle decelerates normally, the lid 2 remains in its locked position when the storage compartment is closed. When the vehicle deceleration—for example in a front-end collision—is sufficiently high, the lid 2 could shift into the open position such that objects located in the storage compartment could be flung about in the vehicle interior and injure passengers.

To prevent this, the exemplary embodiment selected here provides a dead stop 7 on the lid 2, against which the lever 5 arranged to swivel on the housing 1 is brought into contact position under the influence of external acceleration forces. During a crash, the pin 4 is accelerated over the ramp 9 such that the latter—as indicated by the arrow 18—is brought into contact with the dead stop 7, therefore blocking an opening motion of the lid 2 and causing the lid 2 to be in a blocked position.

The invention takes advantage of the spring path predetermined by the push-push mechanism and of the spring path reserve available for unlocking in normal operations when over-pushing the lid 2 to move the lever 5 into the blocked position of the lid 2 without the closed storage compartment opening further or opening fully.

The end of the lever 5 and the dead stop 7—which are brought into actuating position with each other—are adapted on the lid 2 as interacting detent and opposing detent means to also ensure that the lid remains in its blocked position. When the vehicle passenger then shifts the lid 2 into the closed position, the detent and opposing detent means are disengaged on the lever 5 and dead stop 7, therefore again permitting the storage compartment to be operated normally.

It is of course also possible to arrange the connecting link 3 on the locally fixed housing, whereas the lever 5 with pin 4 are arranged to swivel on the lid 2 or container.

REFERENCE NUMERALS

1 Housing
2 Lid
3 Connecting link

4 Pin
5 Lever
6 Opening motion
7 Dead stop, detent
8 Cardioid
9 Slope, ramp
10 Axis of rotation
11 Side wall
12 Guide track
13 Guide pin
14 Locking recess
15 Opening motion (slow)
16 Opening motion (fast)

The invention claimed is:

1. A locking device for a container or lid that can be actuated between an opened position and a closed position in relation to a housing element, comprising:

a first connecting link having a slope;

a first swiveling lever;

a first guide pin engaging into the first connecting link, the first guide pin being arranged on the first swiveling lever, wherein the first guide pin glides along the slope of the first connecting link in the direction of a dead stop arranged on the container or lid under influence of external acceleration forces to bring the first swiveling lever into a position blocking movement of the container or lid, a second connecting link having a second slope, and a second guide pin engaging into the second connecting link, the second guide pin being arranged on the second swiveling lever, wherein the second guide pin glides along the second slope of the second connecting link in the direction of the dead stop arranged on the container or lid under influence of external acceleration forces to bring the second swiveling lever into a position blocking movement of the container or lid.

2. The locking device according to claim 1, wherein the first connecting link with slope is arranged on the container or lid, and the first swiveling lever is arranged to swivel on the housing, or vice-versa.

3. The locking device according to claim 1, wherein the container or lid is disposed in association with the housing element of a motor vehicle, with said motor vehicle defining a high axis (Z), and wherein the first connecting link with slope extends on a side wall of the container or lid in a shifting direction of the container or lid, and wherein the first swiveling lever experiences a moment in direction of the vehicle high axis (Z) under the influence of external acceleration forces, the moment bringing the first swiveling lever into contact position with the dead stop.

4. The locking device according to claim 1, wherein the container or lid is disposed in association with the housing element of a motor vehicle, with said motor vehicle defining a transverse axis (Y) and a vehicle length axis (X), and wherein the first connecting link with slope extends on a bottom of the container or lid in a shifting direction of the container or lid, and wherein the first swiveling lever experiences a moment in the direction of the vehicle transverse axis (Y) or the vehicle length axis (X) under the influence of the external acceleration forces, the moment bringing the first swiveling lever into contact position with the dead stop.

5. The locking device according to claim 1, wherein the dead stop and the first swiveling lever have detent and opposing detent means cooperating with each other in the position blocking movement of the container or lid, and wherein the dead stop and the second swiveling lever have detent and opposing detent means cooperating with each other in the position blocking movement of the container or lid.

6. The locking device according to claim 1, further comprising a push-push mechanism for the container or lid configured to be actuated between the opened position and the closed position in relation to the housing element, wherein the container or lid is held in a detent position against the force of a spring element.

7. The locking device according to claim 1, wherein the first connecting link and the first swiveling lever are provided along a first sidewall of the lid.

8. The locking device according to claim 7, wherein the first swiveling lever rotates in respect of a first axis of rotation located on a first sidewall of the housing element.

9. The locking device according to claim 7, wherein the second connecting link and the second swiveling lever are provided along a second sidewall of the lid.

10. The locking device according to claim 9, wherein the second swiveling lever rotates in respect of a second axis of rotation located on a second sidewall of the housing element, with the container or lid disposed between the first sidewall and the second sidewall of the housing element.

11. The locking device according to claim 1, wherein no additional inertial locking mechanism for the container or lid is provided.

12. A locking device for a container or lid that can be actuated between an opened position and a closed position in relation to a housing element, comprising:

a connecting link having a slope;

a swiveling lever having a first end and a second end, wherein the second end has a sloped end face, and wherein the first end of the swiveling lever is arranged on an axis of rotation on a side of the housing element or on the lid; and a guide pin engaging into the connecting link, the guide pin being arranged on the swiveling lever at or near the second end, wherein the guide pin glides along the slope of the connecting link in the direction of a dead stop arranged on the container or lid under the influence of external acceleration forces to bring the sloped end face of the swiveling lever into contact with the dead stop to block movement of the container or lid; and wherein no weight component is provided on either the first end or the second end of the swiveling lever to exert a load moment on the swiveling lever.

13. The locking device according to claim 12, wherein the connecting link with slope is arranged on the container or lid, and the swiveling lever is arranged to swivel on the housing, or vice-versa.

14. The locking device according to claim 12, further comprising a push-push mechanism for the container or lid configured to be actuated between the opened position and the closed position in relation to the housing element, wherein the container or lid is held in a detent position against the force of a spring element.

* * * * *